(12) United States Patent
Vettese et al.

(10) Patent No.: US 8,002,526 B2
(45) Date of Patent: Aug. 23, 2011

(54) ROTOR DRUM FOR MULTIPLE ROTOR WIND TURBINE

(75) Inventors: Sharolyn Vettese, North York (CA); Alfred Mathieu, North York (CA)

(73) Assignee: Wind Simplicity, Inc., North York, Ontario (CA)

( * ) Notice: Subject to any disclaimer, the term of this patent is extended or adjusted under 35 U.S.C. 154(b) by 907 days.

(21) Appl. No.: 11/964,994

(22) Filed: Dec. 27, 2007

(65) Prior Publication Data

US 2009/0016887 A1    Jan. 15, 2009

Related U.S. Application Data

(60) Provisional application No. 60/911,605, filed on Apr. 13, 2007.

(51) Int. Cl.
*F03D 1/02* (2006.01)

(52) U.S. Cl. .................................. 416/200 R; 416/244 R

(58) Field of Classification Search .............. 416/198 R, 416/200 R, 201 R, 201 A, 196 A, 6, 120, 416/124, 200 A, 198 A, 237, 203; 415/4.3, 4.5, 908, 2.1, 3.1, 4.1, 905, 906

See application file for complete search history.

(56) References Cited

U.S. PATENT DOCUMENTS

| 454,372 | A | * | 6/1891 | Monday | 415/141 |
| 543,462 | A | * | 7/1895 | Bramwell | 290/44 |

FOREIGN PATENT DOCUMENTS

| CA | 2477595 | 2/2006 |
| CA | 2481341 | 4/2006 |
| CA | 2518602 | 10/2006 |

* cited by examiner

*Primary Examiner* — Richard Edgar
(74) *Attorney, Agent, or Firm* — Shoemaker and Mattare

(57) ABSTRACT

According to embodiments described in the specification, provided is a rotor drum for use with a multiple-rotor wind turbine, the rotor drum being mountable on a generator shaft of a generator. The rotor drum comprises a plurality of rotors, each rotor being configured to permit a mounting of a plurality of blades. The rotor drum further comprises a plurality of cross straps affixed to the plurality of rotors for maintaining each of the plurality of rotors in a predetermined spaced-apart relationship. The rotor drum is provided with a mounting coupler provided on at least one of the plurality of rotors for affixing the rotor drum on the generator shaft.

23 Claims, 5 Drawing Sheets

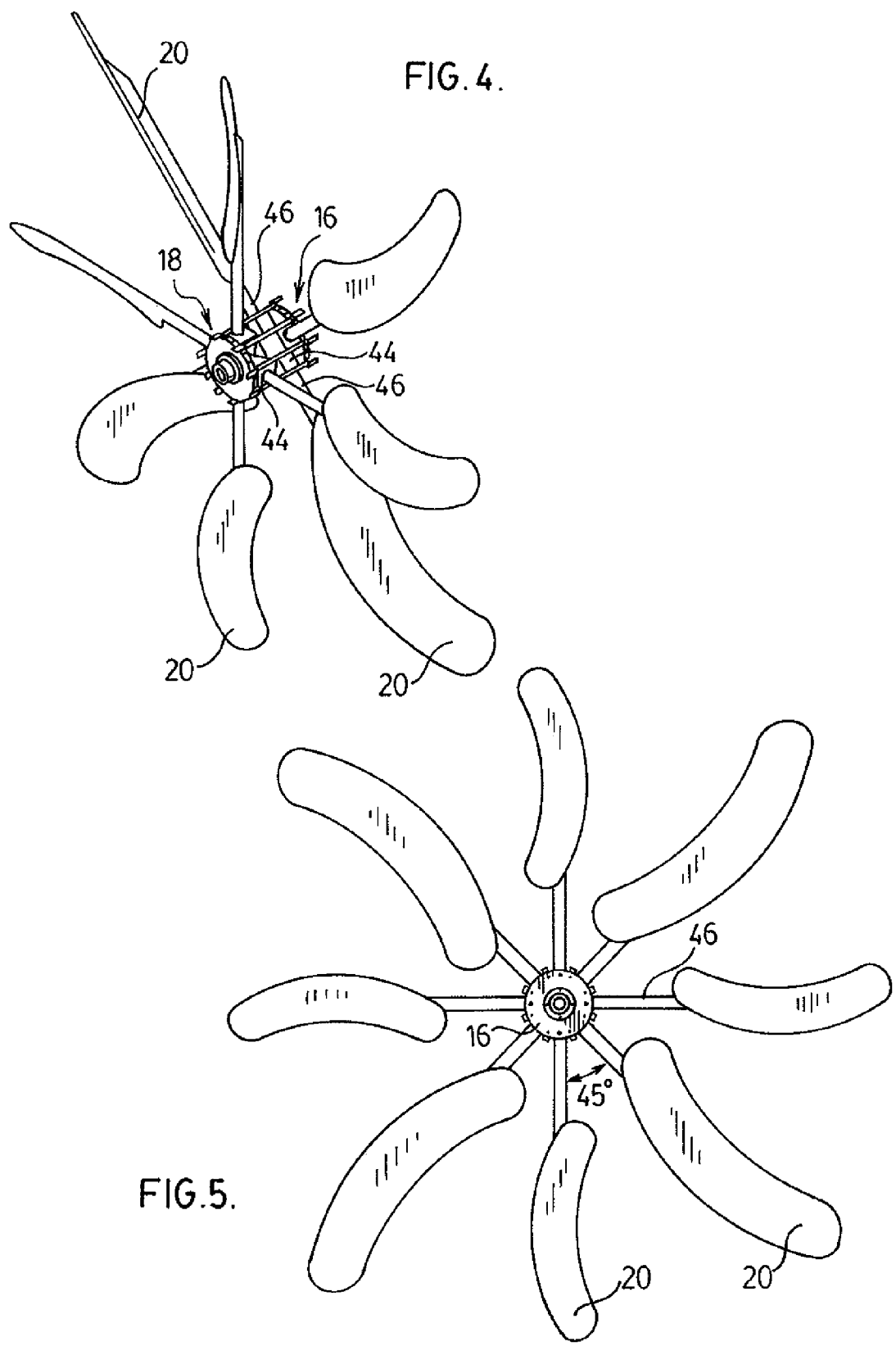

ROTOR DRUM FOR MULTIPLE ROTOR WIND TURBINE

CROSS-REFERENCE TO RELATED APPLICATIONS

This patent application claims priority from U.S. Provisional Patent Application No. 60/911,605, filed Apr. 13, 2007, the entirety of which is incorporated by reference herein and made a part of the present disclosure.

FIELD OF THE INVENTION

The present invention pertains to multiple-rotor wind turbines, and in particular to a rotor drum device which facilitates the mounting of multiple rotors on a wind turbine, on which are secured wind stems and wind blades corresponding to the configuration desired.

BACKGROUND OF THE INVENTION

Wind is a powerful renewable energy source that civilizations have harnessed to varying degrees for several thousand years. Historians accredit ancient Mesopotamia and Egypt as giving rise to sail-based propulsion systems for boats, while most accounts accredit ancient Persia as having developed and implemented windmills in 500 to 900 AD. In around 1390, the Dutch began to refine the windmill, eventually implementing thousands for various applications such as irrigation, land drainage, grain-grinding, saw-milling and the processing of commodities.

With the current awareness of global warming and the human impact upon the environment, there is an increasing shift towards greener, ecologically-friendly technologies. While fossil fuel-fired and nuclear powerplants have been standard methods of power generation for the last century, alternative methods for power generation, particularly from renewable energy sources such as the sun and wind have been attracting increasing attention from industry, governments and the general public.

Modern windmills for power generation are growing in popularity, with wind farms being established in many countries around the world. Modern windmills come in a variety of sizes and configurations, but many associate windmills with the large horizontal wind turbines used for large scale energy generation. These large turbines, generating megawatts of electricity, can stand as tall as 90 meters, with generally three equidistantly spaced blades measuring upwards of 30 meters each. Most large turbines require a transmission, which contributes to their often noted and criticized noise characteristics.

At the same time, there is growing interest for smaller turbine units that are better suited to farm and residential application. Unfortunately, these smaller units are subject to less than optimal wind characteristics as these units are generally located closer to the ground for aesthetic and practical reasons. As such, there is a need for smaller turbine units having wind capturing characteristics that are suited for the conditions under which these smaller turbine units are operated.

While it would seem that a scaled-down version of the common horizontal wind turbine would be suitable for smaller applications, three blades on one rotor can be difficult to balance on rotation, particularly at the higher rates of rotation common on smaller wind turbines. The combination of irregular rotary motion of the wind blades generally results in vibrations from the wind blades and low frequency sounds reverberating from the wind turbine assembly. Numerous studies suggest that vibrations and low frequency sounds emitted by wind turbines cause latent nervous conditions on humans and farm animals.

More recently, multi-rotor wind turbines have been proposed wherein multiple rotors are used to capture and translate wind energy into electricity. While effective at capturing wind, particularly in areas of increased turbulence, such as ground level applications, problems arise in maintaining the rotors balance given the totality of blades present. As such, there clearly exists a need for a rotor mounting system that addresses the shortcomings of current multi-rotor wind turbines.

SUMMARY OF THE INVENTION

According to an aspect of an embodiment, provided is a rotor drum for use with wind turbines and the like, said rotor drum being mountable on a generator shaft of a generator, said rotor drum comprising a plurality of rotors for mounting a plurality of blades, said rotor drum being configured to establish a defined distance between the plurality of rotors, so as to achieve increased efficiency of wind usage.

According to a further aspect of an embodiment, in a wind turbine comprising multiple rotors, an improvement comprising a rotor drum for establishing a predefined distance between said multiple rotors, so as to achieve increased efficiency of wind usage.

According to a still further aspect of an embodiment, provided is a rotor drum for use with multiple-rotor wind turbines, said rotor drum being dimensioned to establish a fixed spaced relationship between multiple rotors attached thereto, said multiple rotors operating cooperatively on a single generator shaft.

BRIEF DESCRIPTION OF THE DRAWINGS

Embodiments of the present application will now be described, by way of example only, with reference to the attached Figures, wherein

FIG. 4 is a front perspective view of the rotor drum of FIG. 3 with blades mounted;

FIG. 5 is a front view of the rotor drum and blades of the embodiment shown in FIG. 1, illustrating the configuration of the blades.

DESCRIPTION OF THE PREFERRED EMBODIMENTS

Figure 1:
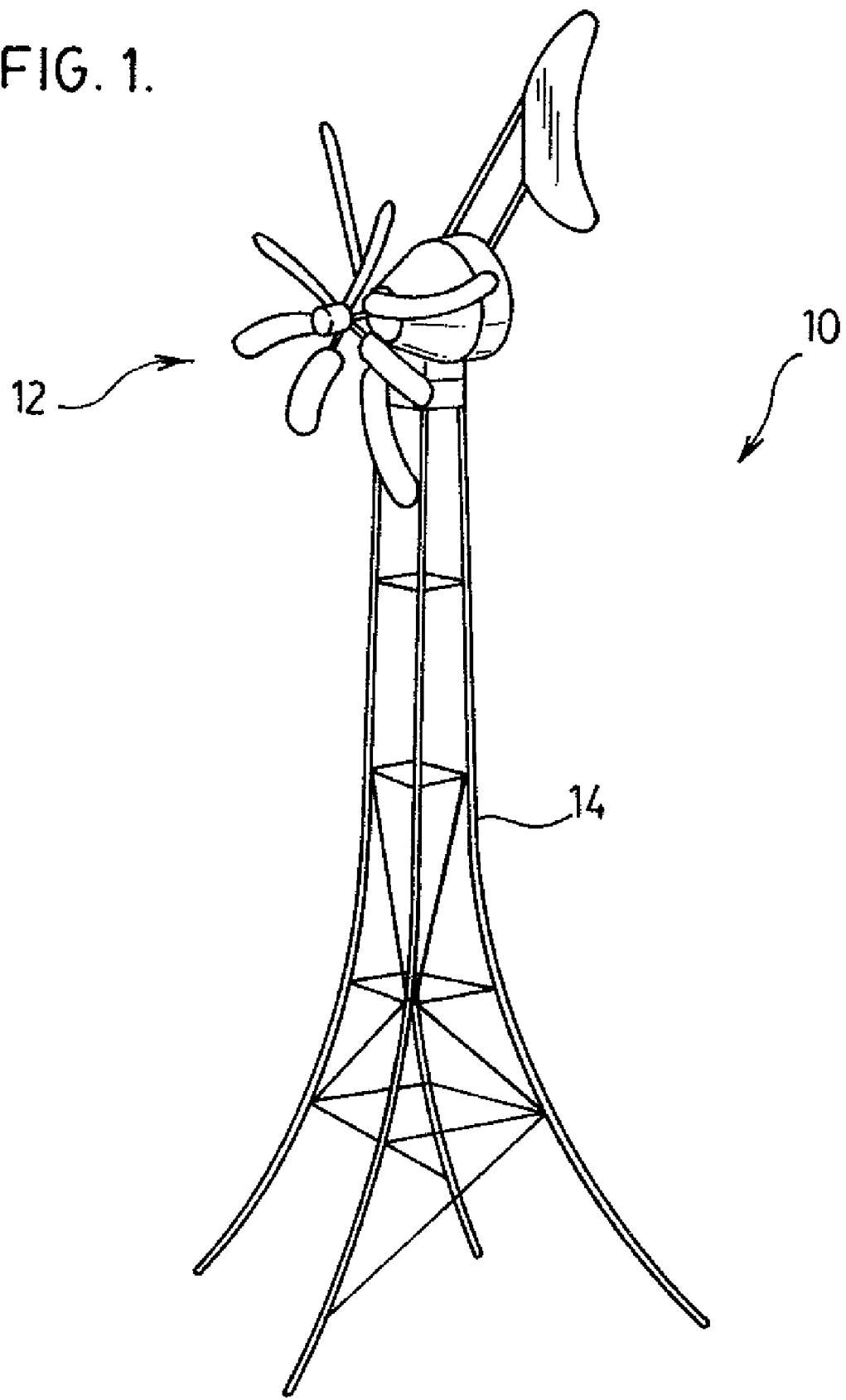
FIG. 1 is a front perspective view of an embodiment showing a complete wind turbine.

Shown in FIG. 1 is a horizontal dual-rotor wind turbine, indicated by reference numeral 10. The dual rotor wind turbine 10 generally comprises a wind assembly 12 rotatably mounted on a tower 14.

Figure 2:
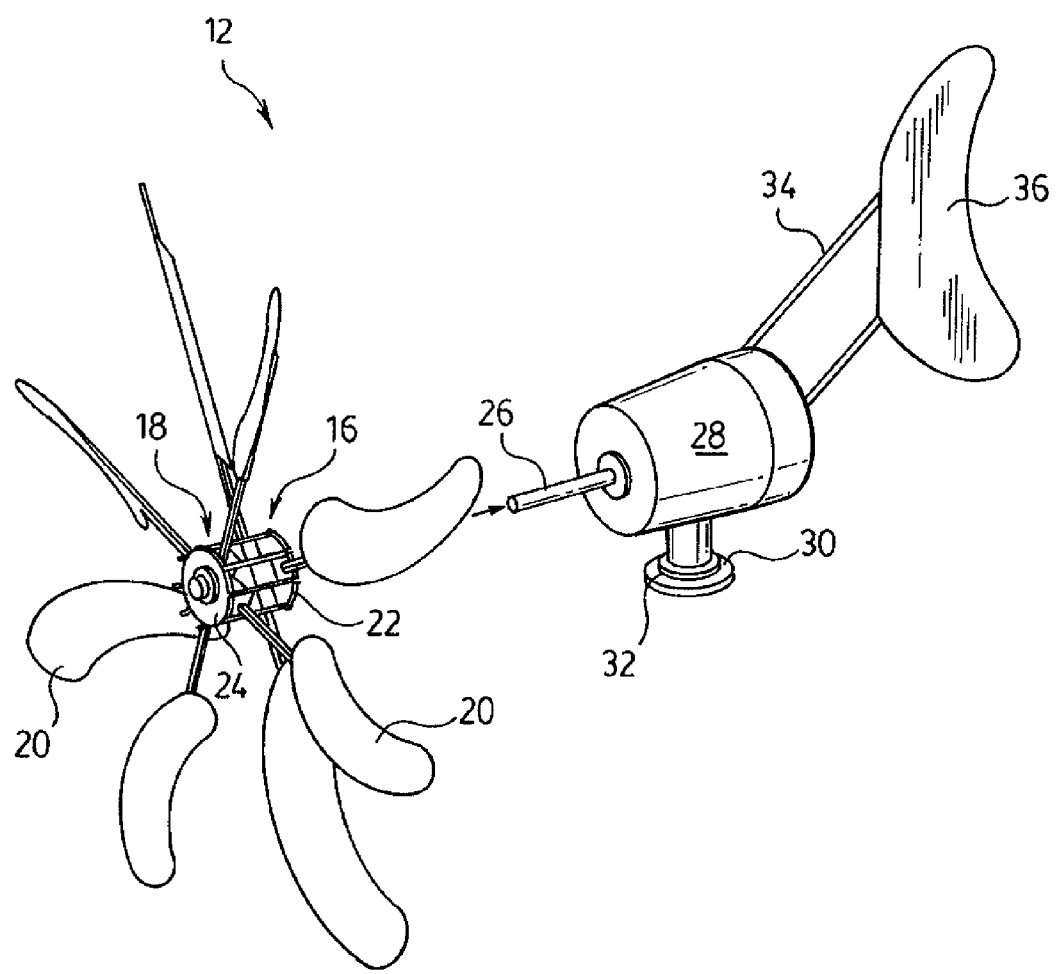
FIG. 2 is a front perspective view of the wind assembly of the embodiment shown in FIG. 1.

Referring to FIG. 2, the wind assembly 12 generally comprises a primary rotor assembly 16 and an auxiliary rotor assembly 18, each rotor assembly having mounted thereon a plurality of blades 20, the blades being circumferentially equidistantly spaced on respective rotors 22, 24. As shown, both the primary rotor assembly 16 and the auxiliary rotor assembly 18 comprise four blades each, and both assemblies work cooperatively to rotate a common generator shaft 26 from a generator 28 affixed to a rotatable tower hub 30 (generator shown detached from rotor assemblies for clarity). In one embodiment, the generator is a variable speed AC alternator with an electricity-producing operating range of 30 to 600 rpm. In a preferred embodiment, the generator is a variable speed direct drive alternator. To enable the wind assembly 12 to rotate relative to the tower 14, and in particular towards the incurrent air (upwind orientation), the tower hub 30 is provided with a rotatable yaw bearing surface 32. Rotation of the wind assembly 12 about tower hub 30 is facilitated by a tail assembly mounted downwind of the wind assembly, the tail assembly generally comprising a tail boom 34 and vane 36.

Figure 3A:
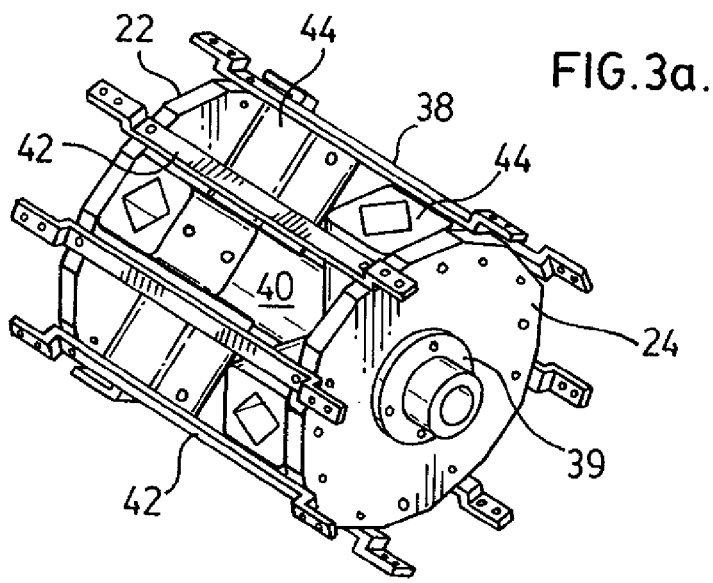
FIG. 3a is a perspective view of the rotor drum of the embodiment shown in FIG. 1.
Figure 3B:
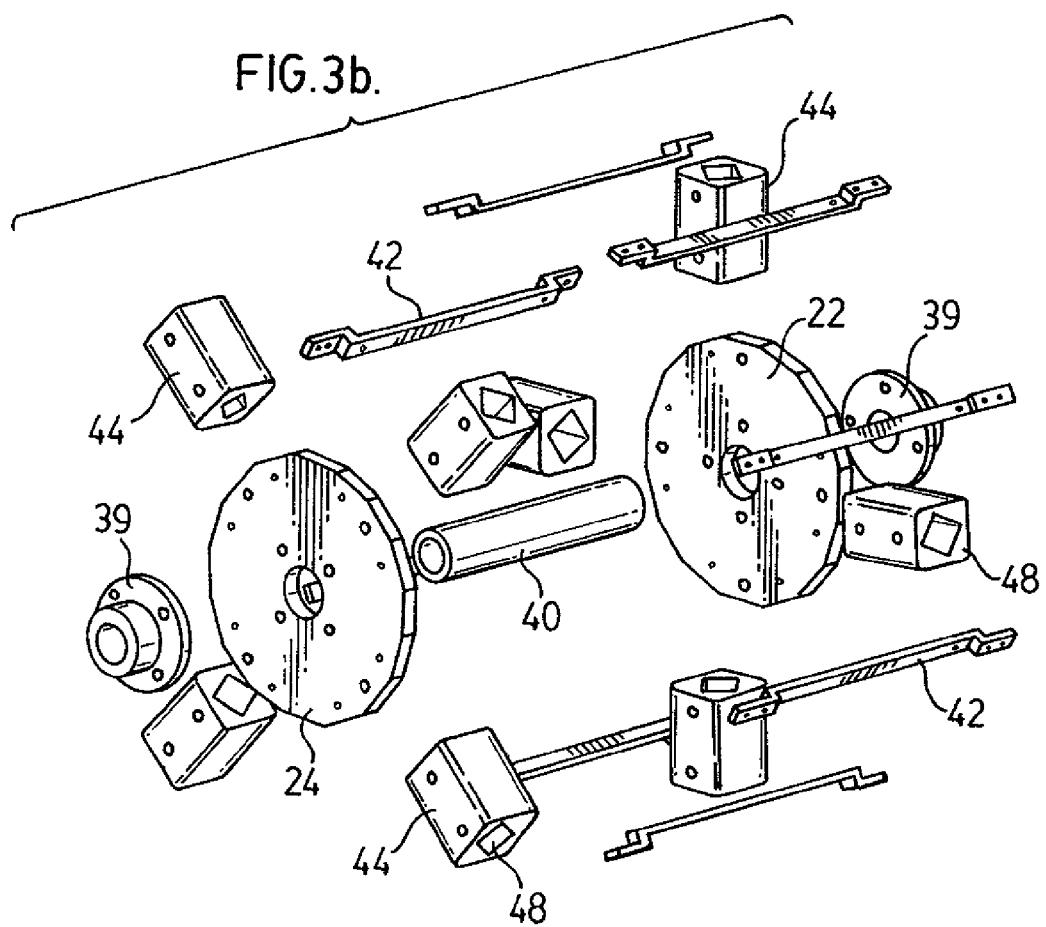
FIG. 3b is a perspective exploded view of the rotor drum of the embodiment shown in FIG. 1.

To facilitate the mounting of the primary rotor assembly 16 and the auxiliary rotor assembly 18 to the common generator shaft 26, a rotor drum 38, comprising of two separate rotors, proportionally spaced on which are secured the wind blades, is provided, as shown in FIGS. 3a and 3b (exploded view). The rotor drum 38 facilitates the intake of wind by the auxiliary blades and then the primary wind blades acts as an exhaust for the wind, thereby increasing the thrust on the blades 20. The rotor drum 38 is configured to facilitate the installation and anchoring of the rotors 22, 24 in a fixed spaced relationship relative to one another. The rotor drum 38 also ensures that both rotor assemblies 16, 18 work cooperatively to rotate the common generator shaft 26. Although the rotor drum 38 can be configured to accommodate a plurality of rotors in fixed spatial relationship relative to one another, the embodiment shown has two rotors 22, 24 present.

The rotors 22, 24 are preferably mounted on a shaft spacer sleeve 40 dimensioned to slidably fit onto the generator shaft 26 of the generator 28. Appropriate mounting gear is provided, so as to ensure the rotor drum 38 remains affixed to the generator shaft 26. Preferably, the mounting gear is configured to retain the rotor drum on the generator shaft, that is to prevent it from sliding off the end of the shaft, as well as to prevent rotational slippage of the rotor drum relative to the generator shaft. As shown, the rotor drum 38 is retained in position on the generator shaft 26 by way of mounting coupler 39 comprising a suitable fastener and/or locking mechanism which engages the generator shaft. While the rotor drum 38 shown comprises a mounting coupler 39 on each end, one will appreciate that a single mounting coupler 39 may be used. To prevent slippage of the rotor drum 38 relative to the generator shaft 26, the generator shaft 26 and mounting couplers 39 are preferably configured with cooperative keyed surfaces. Alternatively, the fastener used to retain the rotor drum 38 in position on the generator shaft may be integral with the cooperative keyed surfaces. For example, the mounting coupler may be configured to receive a pin or key that engages a respective receptacle on the generator shaft, thereby maintaining the rotor drum fixed relative to the shaft. One will appreciate, however, that a variety of fastening/locking systems could be used as would be evident to one skilled in the art.

To maintain rigidity and compensate for gyroscopic and other stresses within the rotor drum 38, a plurality of cross straps 42 are provided that longitudinally span the rotor drum 38 from rotor 22 to rotor 24. In instances when additional stresses are encountered, additional straps (e.g. diagonal straps) can be introduced spanning from one rotor to the other rotor. For example, the rotor drum may further comprise diagonal straps configured to span from the top of one rotor to the bottom of the other. The number of cross-straps 42 will depend on the number of blades 20 to be radially mounted to the rotors 22, 24, as the spacing of the blades 20 on the rotors 22, 24 will dictate the spacing of the cross-straps 42. To facilitate the mounting of the blades 20 onto the respective rotors 22, 24, a plurality of mounting blocks 44 are provided on the inside-facing surface of each rotor 22, 24, one mounting block 44 being provided for each blade stem. The mounting blocks 44 provide a robust mount for the blade stems, enabling the wind assembly to withstand usage and torque stresses of the wind blades at high wind speeds. In a preferred embodiment, the blade stems are tethered together (not shown) to provide added security in the event the blade stem and blade detach from the mounting block during operation. Alternatively, one will appreciate that the blade stems may be tethered to the respective mounting block, or to the rotor drum itself. At each rotor 22, 24, the mounting blocks 44 are positioned so as to result in equidistant spacing between the blades 20 mounted on each respective rotor 22, 24. As shown in FIG. 4, at the primary rotor assembly 16, four mounting blocks 44 are provided, so as to accommodate the four blade stems 46 and blades 20 to be mounted thereon. To affix the mounting blocks 44 within the rotor drum, suitable fasteners are used to attach each mounting block 44 to the appropriate equidistantly spaced position on the rotor 22, 24. For example, threaded fasteners (e.g. bolts) could be used, but one will appreciate of other fastening systems could be implemented as would be evident to one skilled in the art. At the auxiliary rotor assembly 18, the spacing and attachment of the mounting blocks 44 is accomplished in the same manner as described above with respect to the primary rotor assembly 16. Note, however, that the positioning of the mounting blocks 44 on the auxiliary rotor assembly 18 are such that the blades 20 are offset, so as to attain in totality a complete equidistant circumferential spacing having regard to both the primary 16 and auxiliary 18 rotor assemblies. This configuration is best shown in FIG. 5. Thus, when four blades 20 are installed on each rotor 22, 24, there are eight blades 20 in total, with each blade 20 being spaced 45° relative to the next blade 20 on the adjacent rotor. However, the spacing between the auxiliary blades and the primary blades may be spaced differently to facilitate the flow through of the wind provided all the wind blades are offset to each other so that all are balanced circumferentially.

The mounting blocks 44 are removable for ease of maintenance and repair. In addition, while the mounting blocks are machined for a preferred pitch of 33°, other mounting blocks with different pitch angles, for example pitch angles ranging from 30° to 47° could be configured and mounted as described above. Referring back to FIG. 3b, each mounting block 44 provides a receptacle 48 for receiving a blade stem 46. As shown in FIG. 3, the receptacle 48 of the mounting block 44 has a square profile; the blade stem 46 accordingly has a matching square profile for proper and secure seating within the receptacle 48. One will appreciate, however that other profiles for the receptacle and matching blade stem may be used (e.g. triangular, hexagonal, etc.). In addition, each mounting block 44 is provided with suitable fastening means to ensure the blade stem retained within the receptacle 48 is securely attached but removable for maintenance, repair and replacement. For example, the blade stems may be retained in place with threaded fasteners (e.g. bolts), but one will appreciate that other suitable fastening systems could be used as would be evident to one skilled in the art.

In use, the rotor drum permits the installation of multiple blades on two or more rotors, with a designated fixed space between the rotors. The designated space permits the attached wind blades freedom for the wind to intersperse and flow through with minimum restrictions while retaining maximum power, relayed directly to the alternator. The rotor drum may be used with Applicant's parallel concave and convex (PCC) propeller disclosed in Canadian Patent Application No. 2518602 and U.S. patent application Ser. No. 11/874,508, both of which are herein incorporated by reference. One embodiment of the PCC propeller (or blade) is configured to have the same width at both the base region of the blade, and the tip region as shown in FIG. 5. As such, the surface area of the blade is increased as compared to conventional blade designs. Furthermore, with the increased surface area at the tip of the blade, there is greater wind torque realized at the tip. In rotation, the leading edge of the PCC blade is the convex edge, with the trailing edge being the concave edge. In practice, an auxiliary rotor fitted with the PCC blade described above serves to capture the incoming wind and direct it through the space between the rotor assemblies, the space being defined by the rotor drum. In addition, as shown in FIG. 5, each blade is positioned such that an unobstructed region is provided that allows wind to pass between the rotor drum and the base (lower tip) of the blade, thus allowing the wind to flow through and reduce wind turbulence. The blades on each rotor can be the same length or the blades on the auxiliary can be longer than the blades on the primary rotor. In a preferred embodiment, the blades of the auxiliary rotor assembly are smaller than those mounted on the primary rotor assembly. As such, the primary rotor assembly receives both the wind captured by the auxiliary rotor assembly that is directed through the designated space, as well as a portion of the wind passing around the outer circumferential limit of the auxiliary rotor assembly. By providing the space defined by the rotor drum, two aspects are achieved. First, as described above, the auxiliary rotor assembly captures the incoming wind and directs it into the space defined by the rotor drum. Second, the primary rotor assembly provides an exhaust for the wind from this space, thereby drawing more wind from the auxiliary rotor assembly. The assemblies may be of varying compatible sizes. The spacing between the rotors will generally increase or decrease depending on the sizing of the blades of the auxiliary and primary rotor assemblies. In general, the spacing provided by the rotor drum will be a function of the primary and auxiliary rotor assemblies, with larger rotor assemblies using a larger spacing, and smaller rotor assemblies using a smaller spacing. As can be appreciated, the spacing defines a predetermined spaced-apart relationship between the rotor assemblies, with the predetermined spaced-apart relationship being established by the dimensions of the cross-straps and shaft spacer sleeve. An example configuration incorporating the rotor drum would be a 23 kW dual-rotor wind turbine in which the primary blades are 1.5 m in length, the auxiliary blades are 1.0 m in length, the lower tips of the blades being generally 30 cm from the respective mounting block, and the space defined by the rotor assembly is approximately 25 to 35 cm.

Figure 6:
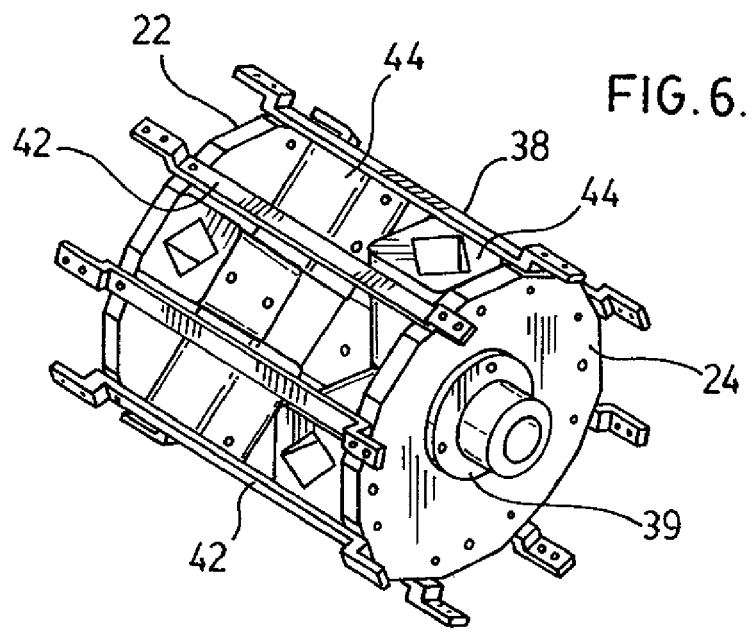
FIG. 6 is a perspective view of an alternate embodiment of the rotor drum.

While the rotor drum has been described as having a shaft spacer sleeve 40 on which the rotors 22, 24 are mounted, a rotor drum configuration in which the shaft spacer sleeve is removed is also contemplated. In an embodiment without the shaft spacer sleeve, the rotors are directly mounted on the alternator shaft, each rotor being provided with the mounting couplers and suitable fastener. The plurality of cross straps 42 longitudinally span the rotor drum from rotor to rotor, as described above, with the cross straps being affixed to the respective rotors using suitable fasteners (e.g. bolts). Additional straps (e.g. diagonal straps) can also be implemented, spanning from one rotor to the other rotor. For example, the rotor drum may further comprise diagonal straps configured to span from the top of one rotor to the bottom of the other. The plurality of cross straps 42 being used are to establish and maintain the predetermined spaced-apart relationship between the rotors, while also providing rigidity and structural support to compensate for gyroscopic and other stresses within the rotor drum. An example of this embodiment is shown in FIG. 6.

Figure 7:
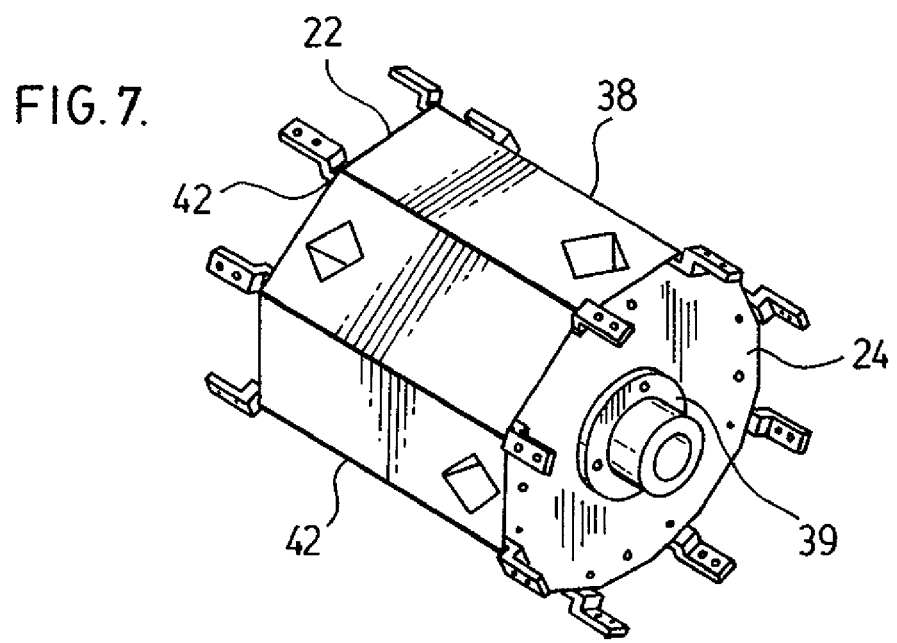
FIG. 7 is a perspective view of a rotor drum encased within a cowling.

The rotor drum 38 is preferably provided with a shield or cowling, effectively encasing the rotor drum. As shown in FIG. 7, the cowling is affixed to the plurality of cross straps, with openings aligned with respective receptacles on the mounting blocks. As will be appreciated, the openings are appropriately dimensioned to permit the passage of the blade stem, into the respective receptacle. The cowling can be manufactured from variety of materials, including, but not limited to plastic, carbon composite, fibreglass or metal. As shown in FIG. 7, the plurality of cross-straps extend past the rotors on each side of the rotor drum. It is also contemplated that the cross-straps are configured to end flush with each of the rotor drums.

The rotor drum is configured to ensure that the totality of blades mounted thereon are equidistantly spaced so as to ensure proper balancing of the system, when mounted on a generator shaft. This serves to assist in reducing vibrations and low frequency sounds being emitted from the wind turbine. In addition, the use of smaller blades, particularly the PCC blades described above allow for turbine start-up at lower wind speeds, as well as providing greater stability in varying winds, and greater power output from low ground wind velocity sites.

The rotor drum as described above offers enhanced efficiency for multiple rotor wind turbines, thereby enabling the use of smaller blades on the respective rotor assemblies. As such, the multiple-rotor wind turbine can be installed on a lower tower, thereby being more suitable for residential/farm use.

While discussed within the framework of horizontal multi-rotor wind turbines, the rotor-drum described above may find application in vertically oriented multi-rotor wind turbines as well. In addition, the rotor drum may find application in a range of other multi-rotor implements. For example, the rotor drum may be used with multi-rotor propellers for aircraft. By increasing the efficiency of the propellers, aircraft engines could operate a lower rpms, and take off using shorter runways. The rotor drum may also be used with fans and the like, such as those installed as ceiling fans in industrial, commercial and residential settings. The size of the rotor may be adapted to smaller or larger shafts, and the blades can be scaled accordingly.

It will be appreciated that, although embodiments of the rotor drum have been described and illustrated in detail, various modifications and changes may be made. While one embodiment is described above, some of the features described above can be modified, replaced or even omitted. It will be appreciated that although the rotor drum explained above is provided with two rotors, further embodiments may comprise wind assemblies having three or more rotors. It will be appreciated that although rotor assemblies having 4 blades each are shown in the above embodiment, alternate configurations are possible such as, but not limited to, 2 blades per rotor, 3 blades per rotor, and 5 blades per rotor. It will also be appreciated that the sizing of the blades may also vary. Although the figures show the auxiliary rotor assembly as having blades that measure smaller than those mounted on the primary rotor assembly, the auxiliary rotor assembly may be provided with blades that measure longer than those provided on the primary rotor assembly, or further with blades that are of substantially equal length. It will also be appreciated that while the wind turbine discussed above has been of the upwind variety, as shown for example in FIG. 1, one skilled in the art would recognize that the rotor drum as described would also be applicable to downwind configured multi-rotor wind turbines. Furthermore, the rotor drum could be used on a combined upwind/downwind wind turbine wherein either the upwind and/or downwind sections are configured for multi-rotor installation. Still further alternatives and modifications may occur to those skilled in the art. All such alternatives and modifications are believed to be within the scope of the invention.

The invention claimed is:

1. A rotor drum for use with a multiple-rotor wind turbine, said rotor drum being mountable on a generator shaft of a generator, said rotor drum comprising:
 a plurality of rotors, each rotor being configured to permit a mounting of a plurality of blades;
 a plurality of cross straps affixed to said plurality of rotors for maintaining each of said plurality of rotors in a predetermined spaced-apart relationship;
 a mounting coupler provided on at least one of said plurality of rotors for affixing said rotor drum on said generator shaft.

2. The rotor drum according to claim 1, further comprising a shaft spacer sleeve on which the plurality of rotors are fixedly mounted.

3. The rotor drum according to claim 1, wherein a mounting coupler is provided on each of said plurality of rotors.

4. The rotor drum according to claim 1, wherein said rotor drum comprises two rotors.

5. The rotor drum according to claim 1, wherein each of said plurality of rotors comprises 4 equidistantly spaced-apart blades.

6. The rotor drum according to claim 5, wherein said rotor drum comprises two rotors, and wherein the two rotors are offset by about 45° relative to one another.

7. The rotor drum according to claim 1, further comprising keyed surfaces between said mounting coupler and said generator shaft to reduce slippage of the rotor drum relative to said generator shaft.

8. The rotor drum according to claim 1, further comprising diagonal cross straps between said plurality of rotors.

9. The rotor drum according to claim 1, further comprising removable mounting blocks on each of said plurality of rotors, said removable mounting blocks facilitating the mounting of blades to each respective rotor.

10. The rotor drum according to claim 9, wherein said mounting blocks are configured to set a pitch to said blades, said pitch being in a range of about 30° to about 47°.

11. The rotor drum according to claim 10, wherein said mounting blocks are configured to set a pitch of 33° to said blades.

12. The rotor drum according to claim 1, wherein said predetermined spaced-apart relationship is defined by said plurality of cross straps affixed to said plurality of rotors.

13. In a wind turbine comprising multiple rotors operating cooperatively to turn a single generator shaft, an improvement comprising a rotor drum for establishing a predefined spaced-apart relationship between said multiple rotors, the rotor drum comprising a plurality of rotors, each rotor being configured to permit a mounting of a plurality of blades, a plurality of cross straps affixed to said plurality of rotors for maintaining each of said plurality of rotors in a predetermined spaced-apart relationship, and a mounting coupler provided on at least one of said plurality of rotors for affixing said rotor drum on said generator shaft.

14. The improvement according to claim 13, wherein said rotor drum further comprises a shaft spacer sleeve on which the plurality of rotors are fixedly mounted.

15. The improvement according to claim 13, wherein a mounting coupler is provided on each of said plurality of rotors.

16. The improvement according to claim 13, wherein said rotor drum comprises two rotors.

17. The improvement according to claim 13, wherein each of said plurality of rotors comprises 4 equidistantly spaced-apart blades.

18. The improvement according to claim 17, wherein said rotor drum comprises two rotors, and wherein the two rotors are offset by 45° relative to one another.

19. The improvement according to claim 13, wherein said rotor drum further comprises keyed surfaces between said mounting coupler and said generator shaft to reduce slippage of the rotor drum relative to said generator shaft.

20. The improvement according to claim 13, the rotor drum further comprising diagonal cross straps between said plurality of rotors.

21. The improvement according to claim 13, the rotor drum further comprising removable mounting blocks on each of said plurality of rotors, said removable mounting blocks facilitating the mounting of blades to each respective rotor.

22. The improvement according to claim 21, wherein said mounting blocks are configured to set a pitch to said blades, said pitch being in a range of about 30° to about 47°.

23. The improvement according to claim 22, wherein said mounting blocks are configured to set a pitch of 33° to said blades.

* * * * *